Sept. 6, 1960

J. B. THOMAS 2,951,404

INDENTING TOOL

Filed Sept. 22, 1958

INVENTOR
J. B. THOMAS

BY Glenn & Jackson

ATTORNEYS

Sept. 6, 1960 J. B. THOMAS 2,951,404
INDENTING TOOL
Filed Sept. 22, 1958 2 Sheets-Sheet 2

INVENTOR
J. B. THOMAS
BY Glenn & Jackson
ATTORNEYS

United States Patent Office 2,951,404
Patented Sept. 6, 1960

2,951,404

INDENTING TOOL

Jesse B. Thomas, Henrico County, Va., assignor to Reynolds Metals Company, Richmond, Va., a corporation of Delaware Filed Sept. 22, 1958, Ser. No. 762,434

13 Claims. (Cl. 81—15)

This invention relates generally to an improved tool which may be detachably secured to a separate article for the purpose of forming an indentation in an exposed surface of that article. More particularly, it relates to a tool of this class for forming an indentation in the edge of a laminated sheet.

In the manufacture of passageway panels formed of laminated metal sheet, aluminum being a particularly suitable metal for this purpose, it is necessary to provide an accurate edge opening in that sheet or panel in order to form an entrance between the laminated layer. Such panels normally include a laminated sheet construction having an intermediate weaker or unbonded area, which sheet after being rolled may have a thickness in the order of only 0.060 inch. Within this small dimension an opening communicating the exterior of the panel with either an unbonded pattern, or a weaker area or lying between the inner faces of the sheets of the panel, must be provided for the purpose of supplying the expanding fluid for completing the panel manufacture. In addition, the edges of the sheet at such opening must not be unduly peened or weakened since they must later be engaged about the inflation needle apparatus through which the expanding fluid is to pass under high pressure. It will be understood that in its broader aspects, the present invention is in no way limited to use with forming openings in the edges of such sheets, but on the contrary may be used generally for forming indentations on the surface of articles which are not in the form of sheets, as for example, on the ends of rods or tubes.

An object of my invention is to provide an improved tool for forming an indentation in the surface of a separate article, with which the tool may be detachably engaged.

Another object is to provide an improved tool for forming an opening in the edge of a passageway panel.

Other objects and advantages will become apparent as the description proceeds and when considered in conjunction with the accompanying drawings in which Fig. 1 is a plan view of one arrangement of the tool with portions broken away.

In accordance with the invention, I provide a tool having a bifurcated body portion with spaced legs which serve to confine spaced portions of the edge of the panel and to give a general alignment of the tool and the panel. Between these legs a clamping member engages the panel in the region where the indentation is to be made and helps to give an exact alignment of the tool and panel so that an indenting needle housed in the body portion of the tool may be brought into contact with the edge of the thus confined and properly aligned panel. Provision further is made for selectively driving the end of the needle into the edge of the panel while simultaneously pulling the edge of the panel progressively into fixed engagement with the clamping member and without any significant peening action upon the separated edges of the panel. Following the forming of an indentation of suitable size and configuration, the tool may then be easily disengaged from the panel.

Figure 1:
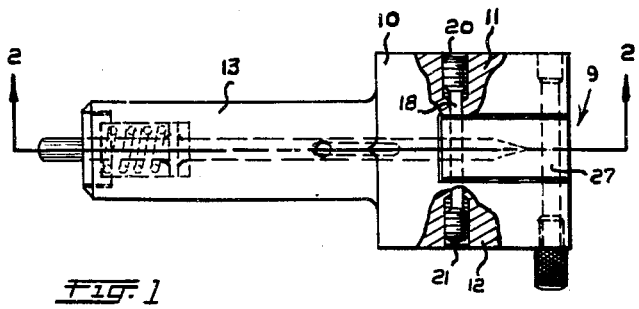

Referring now to Fig. 1, in which the tool is shown with one form of means for limiting the movement of the needle, such a tool may comprise a body portion 10 having spaced leg members 11 and 12 extending therefrom in one direction and a hollow extension 13 extending therefrom in an opposite direction. The leg members are provided respectively with aligned centrally located slits 14 and 15 having a thickness just slightly larger than the thickness of the panel to be confined therein. These slits extend inwardly of the leg members sufficiently far to receive the edge of the sheet when the indenting needle has reached its required penetration of the edge of that sheet.

Pivotally mounted upon the rearward portions of these leg members is a clamping member having a pair of clamping jaws 16 and 17 each with arcuate rearward sections and through which jaws pass dowel pins 18 and 19 respectively, these pins being rigidly mounted upon the leg members of the tool body. The dowel pins may conveniently be held in place at each end by means of set screws, one such pair of screws 20 and 21 for the dowel pin 18 being seen in Fig. 1. The pivoted clamping jaws are positioned with a close fit between the spaced leg portions of the tool body and by reason of the cut-away arcuate rearward portions of those clamping jaws, they may pivot toward or away from each other while remaining attached to the tool body.

Figure 2B:
Fig. 2B is a view taken on line 2B—2B of Fig. 2 and showing the entire cross section of the clamping member.
Figure 2:
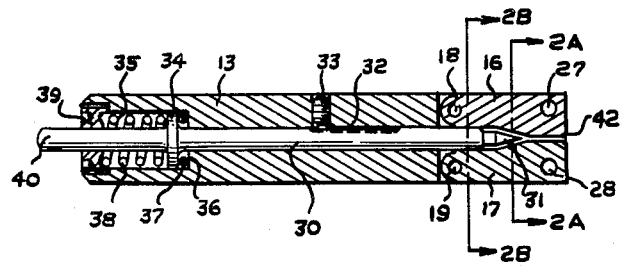
Fig. 2 is a view partly in section taken along line 2—2 of Fig. 1.
Figure 2A:
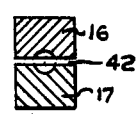
Fig. 2A is a view taken on line 2A—2A of Fig. 2 and showing the entire cross section of the clamping member.

Referring now to Figs. 2A and 2B, an important feature of the invention will be noted and wherein a clamping surface 25 for jaw 16 and a complementary clamping surface 26 for jaw 17 are shown. These clamping surfaces are formed as a forward wall of an aperture extending longitudinally of the clamping jaws and which aperture houses a portion of the indenting rod later to be described. The precise configuration of these surfaces may vary widely without departing from the invention, but when using a conically shaped needle point for the indenting rod, I prefer to make these clamping surfaces in the shape of split conical surfaces having a uniform spacing with respect to the surface of the cooperating conical needle point. As noted in Fig. 2B, the aperture in the jaws 16 and 17 provides a close fit with the rod portion 30, along that part of the jaws rearwardly of the clamping surfaces 25 and 26. This serves to guide the rod to reduce drift of the piercing element.

Figure 3:
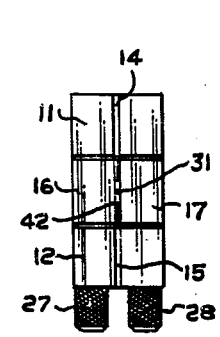
Fig. 3 is a right end view of the tool of Fig. 1.

As best seen in Fig. 3, each of the legs of the tool body is provided with apertures extending therethrough generally parallel to the dowel pins and into which fastening pins 27 and 28 may be removably inserted. Conveniently, these fastening pins may have one knurled enlarged end and may be inserted and removed from either side of the tool body. As seen in Figs. 1 and 2 the pivoted clamping jaws are of course, provided with apertures through which these fastening pins extend with a close fit while the apparatus is being used for the intended purpose.

Within the hollow tool body extention 13, the indenting member comprising an elongated rod portion 30, is suitably mounted at all times. This member is provided at its forward end with a piercing or indenting portion here shown as a conically shaped needle point, or piercing element, 31. This point merges with the main body of the rod, at a distance from its extreme forward end determined by the depth of the indentation desired. The rod portion 30 is axially movable for a short distance within the tool body extension and cooperates therewith with a close fit. When indentations other than of a conical shape are desired, the rod portion must be retrained against rotary movement and for this purpose I provide a keyway 32 therein with which a set screw 33 having a portion projecting into that keyway cooperates.

Adjacent its rearward end the rod portion of the tool is equipped with an enlarged shoulder 34 movable within an enlarged space 35 in the tool body extension, this space being partially defined by a transverse ledge 36 of that extension. Between the shoulder 34 of the movable rod and the ledge of the tool body extension, a resilient member 37 capable of being compressed to a small degree and thus to permit a small movement of the rod portion 30, is interposed. I have found that a rubber O-ring is well suited for use as member 37, although the invention is in no way limited to use of this particular type of member. Belleville (washer type) springs would be of special interest in the event this tool was used above 300° F.

On the opposite side of shoulder 34, a suitable means, for example, stiff spring 38 of helical form, is mounted in spacer 35 and bears at one end against that shoulder, thus holding the needle point 31 normally extended in confronting relation to the article which it is to indent. The opposite end of this spring is held by a plug 39 in threaded engagement with the end of the tool body extension and it is capable of being adjusted so as to vary the compression of spring 38. At its extreme end the rod portion is formed with a striker head 40 projecting outwardly of the plug for a purpose later to become apparent. As will thus be seen, when a sheet is positioned within the above described apparatus as along the dotted line shown at A—A, and with the fastening pins 27 and 28 in place, that sheet is aligned with the axis of the indenting member 30 and movement of that member will force its piercing element 31 with a lamination-separating action into the edge of the sheet at the desired location. The compressible O-ring member 37 meanwhile serves as a resilient abutment against which the shoulder 34 of the indenting member is firmly held by spring 38. In this manner, no undesired play or lost motion in the tool is possible. However, the O-ring still possesses the capability of being further compressed when a sharp blow is made upon the striker head 40 of the indenting member and will reexpand as soon as the force of that blow is spent. Moreover, by adjustment of plug 39 or by substitution of a different O-ring, the position of the needle point 31 with respect to clamping surfaces 25 and 26 may be varied within desired limits. It will be noted that the described tool may be readily disassembled merely by unscrewing the plug 39 and set screw 33 and by removing the fastening and dowel pins. Other clamping jaws may be substituted for jaws 16 and 17 when desired and may be employed with the same tool body.

Figure 4A:
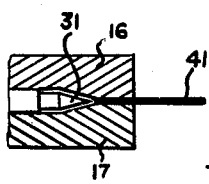
Fig. 4A, 4B and 4C are diagrammatic sectional views of a portion of the tool of Fig. 1 in engagement with a panel and showing sequential positions of the tool and the edge of the panel from an initial to a final step of operation.
Figure 4B:
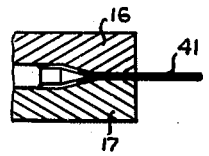
Figure 4C:
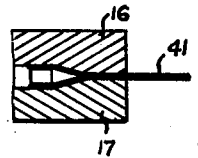
Figures 5, 6:
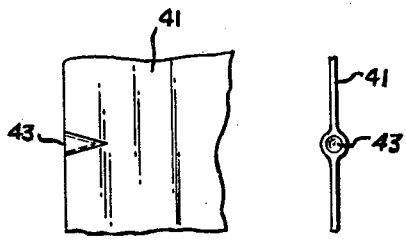
Fig. 5 is a plan view of the edge of a panel after being released from the tool position of Fig. 4C.
Fig. 6 is an end elevation of the panel of Fig. 5.

With the above description in mind, reference now is made to Figs. 4A, 4B and 4C showing the manner in which the tool engages with a panel 41 to be indented. With the jaws 16 and 17 in fastened position with respect to the legs of the bifurcated tool body, an open slit 42 between these jaws (Fig. 3) having a thickness corresponding generally to the thickness of the slits 14 and 15 in those legs, is presented to the confronting edge of panel 41. It will be understood that such a panel should be indented or separated at the precise location where its laminated portions are in contact and that the depth of that indentation normally extends sufficiently far into the panel to open up the inner layer.

Thus upon moving the edge of the panel into the three slits 14, 42, and 15, and into the position A—A of Fig. 1, an accurate alignment of those laminated portions with respect to the axis of the rod portion 30 is assured. As seen in Fig. 4A the edge of the sheet is first moved into these slits until it contacts the needle point 31, whereupon the striker end 40 of the rod 30 is given a sharp blow by any suitable means such as a light hammer or air-operated reciprocating hammer. Upon being so struck, the entire rod moves to the right as seen in Fig. 2 but its movement is limited by the degree of compression of the O-ring, 37. Thus the tool has an inherent safety factor preventing a major rupturing of the sheet at any one stroke. Moreover, by adjustment of the plug 39 the space provided for the separated edges of the sheet between the surface of the needle point and the surfaces 25 and 26 may be modified as needed thus to enlarge or diminish the space into which the separated portions of the indented sheet may pass. This serves a useful purpose in preventing the indenting needle from drifting laterally on its axis and out of the sheet before fully indenting that sheet. It will be understood, however, that any appreciable peening of the separated edges of the sheet is generally undesirable and that by means of this tool the space provided is commensurate with that required for separation of the layers of the sheet without undue peening.

After being struck at its end 40, the needle point 31 of the rod 30 accordingly enters into the exposed and confined edge of the sheet and as the laminations of that sheet separate, they move into contact with the clamping surfaces 25 and 26 of the clamping jaws 16 and 17. As this occurs, the indenting tool becomes clamped to the sheet in readiness for the next stroke, the sheet meanwhile having moved relatively to the left as seen in Fig. 4B. As successive strokes occur, the indentation successively becomes larger and the sheet moves progressively to the left until it reaches the position as indicated in Fig. 4C and by the dotted line B—B of Fig. 1. It will be understood that after each stroke on the striker head 40, the resilient O-ring 37 expands against the action of spring 38 and provides another increment of space between the needle point 31 and the partially indented edge of the sheet, thus to accommodate the subsequent movement of the needle point at the next stroke.

After the indentation is formed to the desired extent the fastening pins 27 and 28 are slipped out, the clamping jaws 16 and 17 are pivoted to open position and the indented sheet is removed from the tool. Such a sheet may, for example, have at this time a conical indentation 43 of sufficient size for later reception of an inflation needle, the indentation being accurately located in its edge and extending inwardly far enough so as to permit the inflation needle to introduce fluid pressure into the sheet once the sheet is clamped around the inflation needle. In some cases it may be desirable to have an orifice in the indenting needle so as to eliminate the necessity of an inflation needle, the expanding fluid being introduced through the orifice of the indenting needle.

Figure 7:
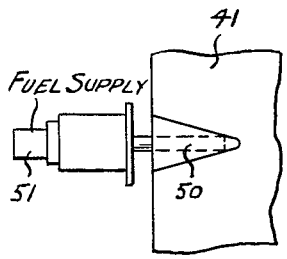
Fig. 7 is a schematic view showing the indented panel of Fig. 5 in relation to an inflation needle later used in expansion of the indented panel.
Figure 8:
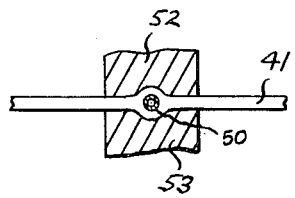
Fig. 8 is a sectional view showing the edge of the panel of Fig. 6 with the clamping jaws of an inflation needle apparatus engaged therewith.

As shown in Figs. 7 and 8, a suitable inflation needle apparatus having a hollow needle 50 with a conical surface at one end and communicating with a fluid supply conduit 51, may later be used in inflating the indented sheet, such an inflation apparatus forming no part of the present invention. When, however, the clamping jaws 52 and 53 of the inflating apparatus engage the outer surfaces of the sheet at indentation 43, they serve to coin the previously separated unpreened edges of the metallic sheet into close engagement with needle 50 and give a strong and leakproof coupling of the respective parts.

Figure 9:
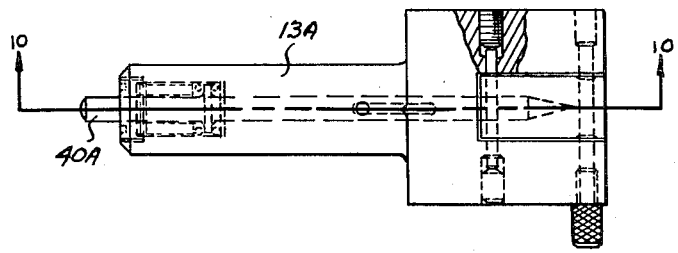
Fig. 9 is a view similar to Fig. 1 showing a second arrangement of the indenting tool.
Figure 10:
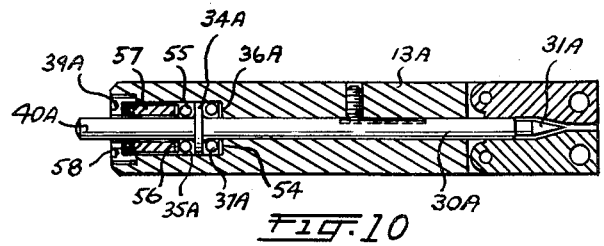
Fig. 10 is a view partly in section on line 10—10 of Fig. 9.

Referring now to Figs. 9 and 10, an indenting tool of the type above described may employ other means for limiting the displacement of the rod and its needle point. As seen therein, a rod 30A mounted within hollow extension 13A may have a piercing element 31A adapted to operate in the described manner. Adjacent its rearward end the rod has an enlarged shoulder 34A movable within an enlarged space 35A in the tool body extension, this space being defined in part by a transverse ledge 36A of that extension. Between the shoulder and the ledge a resilient member 37A of the O-ring type is disposed and with one or more suitable spacing washers 54 interposed between the O-ring and that ledge.

On the opposite side of the shoulder, another resilient member 55 of the O-ring type is mounted in the space 35A and is backed by one or more spacing washers 56. Positioned within the space in contact with the washer is a suitable hollow plug member 57 against whose outer end a plurality of spacing washers 58 are in contact. An outer hollow plug 39A threadedly engaging with the end of extension 13A completes the assembly. By means of this arrangement a close control over the movement of the needle may be secured at all times, since reexpansion of the O-ring 37A following a stroke on the striker head 40A of the rod, is opposed by the companion O-ring 55. Accordingly, any tendency toward peening of the separated edges of the sheet confined between the needle point and the recesses in the clamping jaws is minimized.

Figure 11:
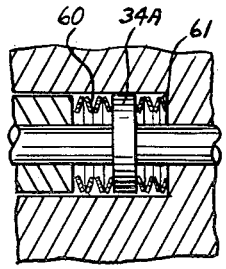
Fig. 11 is a detail view of a third arrangement of the indenting tool showing a different form of limiting means for the needle.

Other means for accomplishing this purpose may also be used without departing from the invention. As shown in fragmentary form in Fig. 11 one or more metallic springs of the chevron type for example, may be used on each side of the shoulder 34A as an alternative to using a resilient O-ring made of rubber or similar material. When using such springs, the separate washers 54 and 56 may be omitted from the combination of elements. Springs 60 and 61 preferably are of high temperature resisting steel and possess a high degree of internal resiliency.

As will thus be apparent, the objectives of my invention are accomplished in a simple and reliable manner.

Due to the accuracy with which the tool in its several illustrated forms may be attached to the article to be indented and to the prevention of drift of that tool during use, and to the reduction of peening, damage to such sheets during an edge-opening step of manufacture of passageway panels no longer need be a manufacturing problem. The tool may be used repeatedly without requiring time-consuming adjustments, may be used by relatively unskilled personnel, and is relatively inexpensive.

In accordance with the patent statutes, I have described what at present is considered to be the preferred embodiment of my invention, but it will be obvious to those skilled in the art that various changes and modifications may be made therein without departing from the true spirit and scope of the invention, and I, therefore, aim to cover in the appended claims, all such equivalent variations and modifications.

What is claimed is:

1. A tool of the class described comprising, a bifurcated body portion having legs provided with slits to confine the edge of a flat sheet of material therein, an apertured clamping member adjustably mounted upon said body portion between said legs, said body portion having a hollow extension aligned with the plane of the confined edge of said sheet, and an indenting member mounted in said extension and in the aperture of said clamping member in confronting relation to the edge of said sheet and adapted to be forced into contact with the edge of said sheet, thereby to form an indentation therein.

2. An indenting tool comprising a body portion, an indenting member movably mounted in said body portion and having a piercing element at one end and a striker head at an opposite end, an adjustable clamping member for an article to be indented, said clamping member being mounted upon said body portion and having means for guiding said article into contact with said piercing element, and means for limiting the indenting movement of said indenting member into said article, thereby to prevent excessive rupturing of said article during movement of said indenting member following a blow upon the striker head thereof.

3. A tool as described in claim 2 wherein said body portion includes a leg portion extending alongside said clamping member and having a pin therein upon which said clamping member is pivotally mounted.

4. A tool as described in claim 2 wherein said body portion includes a leg portion extending alongside said clamping member and, having a pin therein upon which said clamping member is pivotally mounted and a second adjustable pin therein upon which said clamping member may be removably secured during movement of said indenting member.

5. An indenting tool comprising a body portion, an indenting member movably mounted in said body portion and having a piercing element at one end and a striker head at the opposite end, an adjustable clamping member having interior clamping surfaces spaced from the surfaces of an article being indented said clamping member being mounted upon said body portion and having means for guiding said article into contact with said piercing element, and means for adjusting the spacing between the clamping surfaces of said clamping member and the surface of said piercing element thereby to prevent lateral drift of the piercing element during movement of said indenting member and following a blow upon the striker head thereof.

6. A tool as described in claim 5 wherein said clamping member is fitted closely to said indenting member rearwardly of the piercing element thereof, thereby to assist in guiding said indenting member during forward movement thereof into contact with said article and to reduce lateral drift of said piercing element.

7. In an indenting tool comprising a body portion, an indenting member movably mounted in said body portion and having a piercing element at one end and a striker head at a second end, and means for attaching said tool to an article to be indented, means for limiting the indenting movement of said indenting member into said article and including a resilient member positioned in contact with said indenting member intermediate the ends thereof and adapted to absorb the force imparted to said striker head, thereby to limit the movement of said member.

8. A tool defined in claim 7 wherein said resilient member comprises an O-ring member.

9. A tool defined in claim 7 wherein said resilient member comprises a metal spring member.

10. In an indenting tool comprising a body portion, an indenting member movably mounted in said body portion and having a piercing element at one end, a striker head at a second end, and an enlarged shoulder intermediate said ends, and means for attaching said tool to an article to be indented, means for limiting the movement of said member in each direction and including a first resilient member positioned in contact with one side of said shoulder and a second resilient member positioned in contact with the opposite side of said shoulder, whereby forces tending to move said indenting member in either direction are absorbed by a resilient member.

11. A tool as defined in claim 10 wherein each of said resilient members comprise O-ring members.

12. A tool as defined in claim 10 wherein said first resilient member comprises an O-ring member and said second resilient member comprises a spring.

13. A tool as defined in claim 10 wherein each of said resilient members comprises a spring.

References Cited in the file of this patent

UNITED STATES PATENTS

| | | |
|---|---|---|
| 2,457,930 | Smith | Jan. 4, 1949 |
| 2,740,188 | Simmons | Apr. 3, 1956 |
| 2,835,025 | Pauls | May 20, 1958 |
| 2,845,695 | Grenell | Aug. 5, 1958 |

FOREIGN PATENTS

| | | |
|---|---|---|
| 784,112 | Great Britain | Oct. 2, 1957 |